US009727822B1

(12) United States Patent
Miller et al.

(10) Patent No.: US 9,727,822 B1
(45) Date of Patent: *Aug. 8, 2017

(54) EVENT PREDICTION USING TEMPORAL AND GEOSPATIAL PRECURSOR NETWORKS

(71) Applicant: Priority 5 Holdings, Inc., Boston, MA (US)

(72) Inventors: Charles Q. Miller, Boston, MA (US); Allen D. Bierbaum, Ames, IA (US); Donald D. Dudenhoeffer, Idaho Falls, ID (US); Anthony J. McDermott, Drakut, MA (US); David M. Miller-Klugman, Medfield, MA (US)

(73) Assignee: Priority 5 Holdings, Inc., Boston, MA (US)

(*) Notice: Subject to any disclaimer, the term of this patent is extended or adjusted under 35 U.S.C. 154(b) by 102 days.

This patent is subject to a terminal disclaimer.

(21) Appl. No.: 14/696,962

(22) Filed: Apr. 27, 2015

Related U.S. Application Data

(63) Continuation of application No. 13/890,844, filed on May 9, 2013, now Pat. No. 9,024,757.

(60) Provisional application No. 61/644,579, filed on May 9, 2012.

(51) Int. Cl.
  *G06N 7/00* (2006.01)
  *G08B 31/00* (2006.01)
  *G06N 99/00* (2010.01)

(52) U.S. Cl.
  CPC ........... *G06N 7/005* (2013.01); *G06N 99/005* (2013.01); *G08B 31/00* (2013.01)

(58) Field of Classification Search
  CPC ...................................................... G06N 7/005
  USPC .......................................................... 706/47
  See application file for complete search history.

(56) References Cited

U.S. PATENT DOCUMENTS

| 6,105,046 | A  | 8/2000  | Greenfield et al. |
| 6,906,709 | B1 | 6/2005  | Larkin et al. |
| 7,068,161 | B2 | 6/2006  | Germaine et al. |
| 7,194,395 | B2 | 3/2007  | Genovese |
| 7,397,369 | B2 | 7/2008  | Zajac et al. |
| 7,653,609 | B2 | 1/2010  | Friedlander et al. |
| 8,427,309 | B2 | 4/2013  | Bullard et al. |
| 2002/0120714 | A1 | 8/2002 | Agapiev |
| 2003/0187967 | A1 | 10/2003 | Walsh et al. |

(Continued)

OTHER PUBLICATIONS

Gilfeather et al ("Pre Incident Indicator Analysis (PIIA) System" Aug. 17, 2011).*

(Continued)

*Primary Examiner* — Lut Wong
(74) *Attorney, Agent, or Firm* — Burns & Levinson LLP; Orlando Lopez

(57) ABSTRACT

The present invention provides a system and method for providing an alert notification prior to occurrence of a consequent event. The present invention provides a decision maker with the means to reconstitute his unfiltered operational environment such that the information needed to make an informed decision is extracted from a vast array of data available and presented in a manner that allows the decision maker to focus on the aspects of the decision that are most important to arriving at the best course of action under the exigent circumstances that are present when a response to an unexpected and possibly deleterious event is required.

5 Claims, 10 Drawing Sheets

Actual Event Processing Example

(56) References Cited

U.S. PATENT DOCUMENTS

| | | |
|---|---|---|
| 2004/0008125 A1 | 1/2004 | Aratow et al. |
| 2004/0243595 A1 | 12/2004 | Cui et al. |
| 2005/0001720 A1 | 1/2005 | Mason et al. |
| 2005/0004823 A1 | 1/2005 | Hnatio |
| 2005/0034075 A1 | 2/2005 | Riegelman et al. |
| 2005/0086227 A1 | 4/2005 | Sullivan et al. |
| 2005/0234696 A1 | 10/2005 | North et al. |
| 2006/0010108 A1 | 1/2006 | Greenberg |
| 2006/0136860 A1 | 6/2006 | Boshart et al. |
| 2006/0167728 A1 | 7/2006 | Siegel et al. |
| 2006/0168185 A1 | 7/2006 | McCall et al. |
| 2006/0235833 A1 | 10/2006 | Smith et al. |
| 2007/0021955 A1 | 1/2007 | Tolone et al. |
| 2007/0297589 A1 | 12/2007 | Greischar et al. |
| 2007/0299746 A1 | 12/2007 | Haley et al. |
| 2008/0040174 A1 | 2/2008 | Murthy et al. |
| 2008/0052054 A1 | 2/2008 | Beverina et al. |
| 2008/0114878 A1 | 5/2008 | Gopalkrishnan et al. |
| 2008/0172262 A1 | 7/2008 | An et al. |
| 2008/0178178 A1 | 7/2008 | Kumar et al. |

OTHER PUBLICATIONS

Ivan Koychev ("Approaches for Learning Classifiers of Drifting Concept" 2008).*

Smith et al ("Geospatial Analysis of Terrorist Activities: The Identification of Spatial and Temporal Patterns of Preparatory Behavior of International and Environmental Terrorists" May 2008).*

* cited by examiner

Actual Event Processing Example

Operator Notification of Precursor Activity Status

GIS Display of Satisfied Precursor Activities

Potential Consequent Event Location Search

Consequent Event Location Based on Analysis

EVENT PREDICTION USING TEMPORAL AND GEOSPATIAL PRECURSOR NETWORKS

CROSS REFERENCE TO RELATED APPLICATIONS

This application is a continuation of U.S. patent application Ser. No. 13/890,844, filed on May 9, 2013, entitled EVENT PREDICTION USING TEMPORAL AND GEOSPATIAL PRECURSOR NETWORKS, issued as U.S. Pat. No. 9,024,757, which in turn claims benefit of and priority to U.S. Provisional Application No. 61/644,579, filed on May 9, 2012, the entire contents of both of which are incorporated herein by reference for all purposes.

BACKGROUND

The present disclosure relates to a system and method for providing decision support. More particularly, the present disclosure relates to a system and method for providing decision support, using precursor networks to predict an event.

Many events of significance (Consequent Events) are preceded by a network of other events that have geospatial and time relationships both to one another and to a particular Consequent Event that they precede (each of such other events being a Precursor Activity and the network of such Precursor Activities being a Precursor Activity Network).

In many cases, the relationships among specific Precursor Activities that constitute a Precursor Activity Network and between a Precursor Activity Network and the Consequent Event that it precedes can be documented by, or from information gathered from, subject matter experts (SMEs). In some cases, such documentation has consisted of studies or scholarly works (see, for example, the study funded by the U.S. Department of Justice entitled "Pre-Incident Indicators of Terrorist Incidents: The Identification of Behavioral, Geographic, and Temporal Patterns of Preparatory Conduct" by Brent L. Smith, Kelly R. Damphousse, and Paxton Roberts, Terrorism Research Center in Fulbright College, University of Arkansas).

Presently, the Precursor Activities are manually documented and searched against suspect events, which renders real time or near real time alert of certain events impossible or impracticable. Accordingly, there is a need to establish an automated method and system so as to quickly search for precursor activities, identify evolving Consequent Events, and provide alerts to users on a real time or near real time basis.

SUMMARY

The above and other needs are addressed in illustrative embodiments of the present invention set forth below. One objective of the present invention is to provide a system and a method that may automate the process by which the specialized knowledge of a subject matter expert (SME), memorialized in computer software program, may be used by the computer software program to examine available information and apply rules developed by the SME to identify possible Precursor Activities and possible Consequent Events, as to the possible time and location, and bring them to the attention of individuals who are without specialized training so that alarms and notifications may be made and other steps taken to prevent the occurrence of an identified Consequent Event or to minimize the adverse effects thereof.

According to one aspect, the method of the present invention comprises providing, in a non-volatile computer memory, a precursor network comprising data associated with a plurality of precursor activities, each of the precursor activities having a weighting factor associated with, the precursor network being associated with a consequent event; upon occurrence of an actual event, determining whether the actual event is consistent with at least one of the precursor activities in a precursor network, in accordance with criteria associated with each of the precursor activities; if the actual event is consistent with at least one of the precursor activities in the precursor network, updating the precursor network by noting the occurrence of the additional precursor activity in the precursor network; calculating an indicative value of the updated precursor network by aggregating the weighting factors for all of the precursor activities that have occurred in the precursor network; if the indicative value exceeds a predefined threshold value, issuing an alert notification indicating an increased likelihood for the consequent event; and displaying, on a display panel, the alert notification to an operator.

According to another aspect, the method of the present invention comprises: (a) creating multiple Precursor Activity Networks based upon relationships developed by SMEs, each related to a specific type of Consequent Event; (b) as actual events unfold, aligning and realigning these Precursor Activity Networks in a systematic process by identifying the precursor activities in the various Precursor Activity Networks that are consistent with actual events in accordance with the precursor activity characteristics set by the SME; and (c) when the aggregate sequence of activities from a Precursor Activity Network that have actually occurred exceed a defined threshold, instructing the computer is to issue an alert or otherwise bring to the attention of an operator the increased likelihood of the Consequent Event.

The method further comprises identifying one or more SMEs that has knowledge of the conditions/events that presage a Consequent Event; for each Consequent Event to be considered, based on interviews and/or evaluation of written materials prepared by the SMEs, determining the precursor activities, alert type, alert keywords, and or other alert characteristics that indicate the occurrence of a precursor activity, the characteristics that define relationships between precursor activities (for example temporal and geospatial) and the Consequent Event as described previously; for each precursor activity in the Precursor Activity Network, based on interviews and/or evaluation of written materials prepared by the SMEs, identifying any confirmatory action that must be initiated to determine that a precursor activity has in fact occurred, and; for each precursor activity in the Precursor Activity Network, based on interviews and/or evaluation of written materials prepared by the SMEs, identifying a relative weighting for each precursor activity in the Precursor Activity Network such that the sum of the weighting factors of appropriate combinations of precursor activities will reach or exceed a preset total that will indicate increased likelihood of the Consequent Event.

The method further comprises using TACCS™ (see, for example, U.S. patent application Ser. No. 12/208,738, filed on Sep. 11, 2008) or a similar system to gain access to alerts from as many sources as available; when each alert is received, comparing the alert categorization and accompanying text to determine if the alert matches the characteristics that indicate the occurrence of a precursor activity in one or more Precursor Activity Networks; if the alert matches the characteristics that indicate the occurrence of a precursor activity in one or more Precursor Activity Networks, activating those Precursor Activity Networks, triggering the precursor activity in that Precursor Activity Network; if the precursor activity occurs in an activated Precursor Activity Network, triggering the precursor activity in that activated Precursor Activity Network; keeping each precursor activity triggered in an activated Precursor Activity Network in the triggered state until the relationships to the Consequent Event is such that it no longer satisfies the criteria set forth in the Precursor Activity Network, and; keeping each Precursor Activity Network activated until there are no triggered precursor activities remaining.

The method further comprises upon the occasion of triggering a precursor activity, calculating the total weighting of all triggered precursor activities for all Precursor Activity Networks; for each Precursor Activity Network that has a total weighting that exceeds a preset value, creating an alarm that notifies the operator of the increased likelihood of the Consequent Event and lists the detailed information that accompanied the alerts that triggered precursor activities in the Precursor Activity Network; presenting a visualization of the triggered activity network to assist with processing and analysis.

One such embodiment may include a geospatial display that indicates the location of each alert that triggered a precursor activity and a shaded circle around the alert with a radius that corresponds to the geospatial relationship between the corresponding precursor activity and the Consequent Event as defined in the Precursor Activity Network, and; Incrementally increasing the degree of shading if the shaded areas surrounding the alerts overlap.

Further, according to one aspect, a system of the present invention may enable individuals without specialized training to determine in real or near real time that an event of consequence is likely to occur. The system comprises a module for creating multiple Precursor Activity Networks based upon relationships developed by SMEs, each related to a specific type of Consequent Event; as actual events unfold, a module for aligning and realigning these Precursor Activity Networks based upon their characteristics in a systematic process by identifying the precursor activities in the various Precursor Activity Networks that are consistent with actual events in accordance with the geospatial, temporal, and other precursor characteristics set by the SME; and when a sufficient number of the precursor activities embedded in a Precursor Activity Network have occurred to indicate the likelihood of a Consequent Event, a module for presenting the information in real or near real time and in a manner that it can be understood and acted upon by an individual without specialized analysis training.

In view of the above, embodiments of the present invention provide a decision maker with the means to reconstitute his unfiltered operational environment such that the information needed to make an informed decision is extracted from the vast array of data available and presented in a manner that allows the decision maker to focus on the aspects of the decision that are most important to arriving at the best course of action under the exigent circumstances that are present when a response to an unexpected and possibly deleterious event is required.

BRIEF DESCRIPTION OF THE DRAWING

Embodiments of the present invention are described in connection with the accompanying drawings.

DETAILED DESCRIPTION

Figure 1:
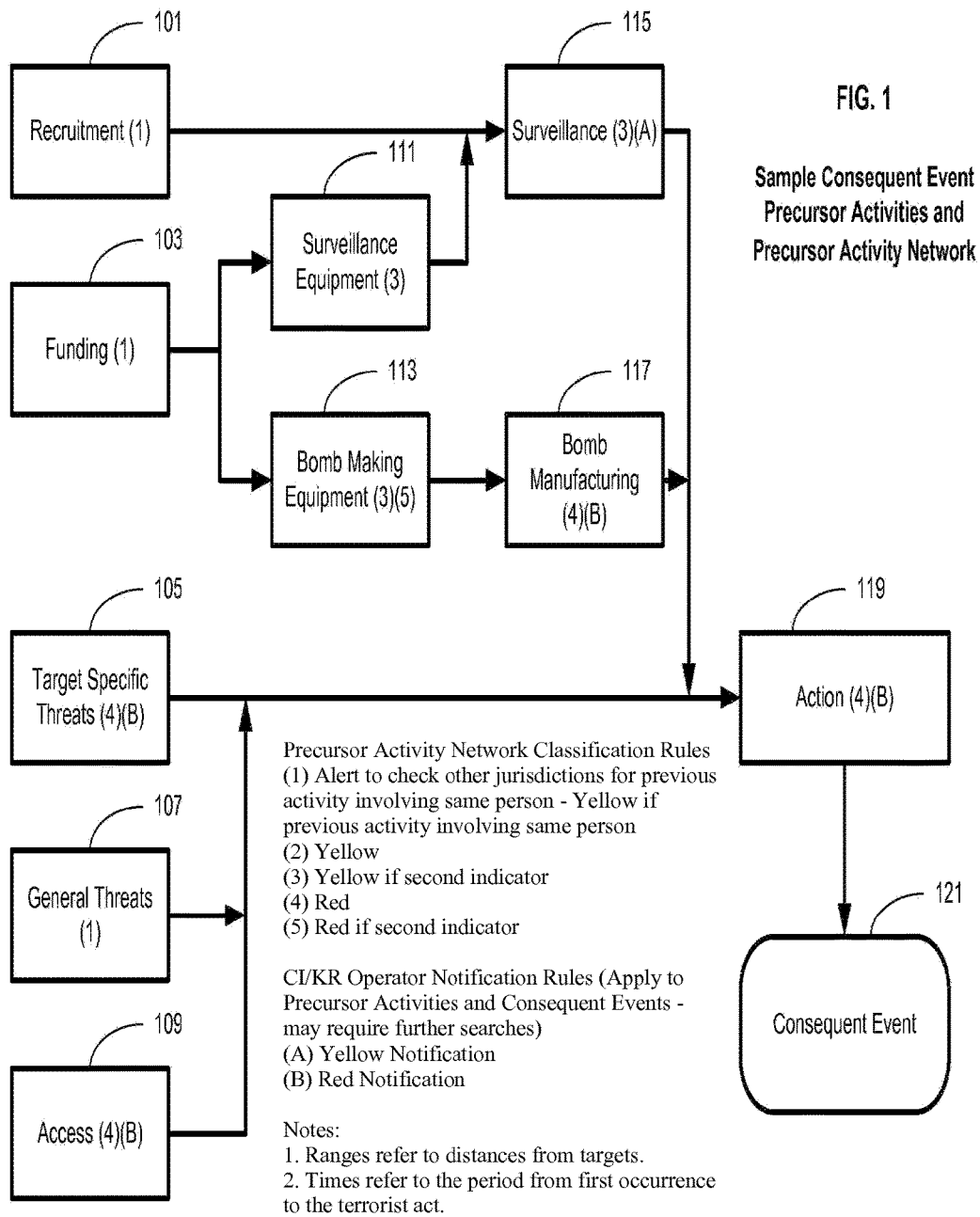
FIG. 1 illustrates a representative logic diagram for sample consequent event, precursor activities, and precursor activity network, in accordance with an embodiment of the present invention.

Embodiments of the present disclosure are described more fully hereinafter with reference to the accompanying drawings. It is to be understood that the detailed descriptions are presented for illustrative purposes only. Any computer configuration and architecture satisfying the speed and interface requirements herein described may be suitable for implementing the system and method of various embodiments of the present disclosure.

The system and method of the present invention may be implemented as a computer software program stored in a computer memory (non-volatile) and executable on one or more computers (hardware or virtual). In one embodiment, the computer software program may be configured to identify (1) the likely occurrence of one or more Precursor Activities that are related to one or more possible identified Consequent Events, (2) the increased likelihood of the occurrence of one or more of such identified Consequent Events, and (3) the general characteristics (such as geographical area, time, target profile, and attack method) associated with each such Consequent Event so identified as being likely to occur.

One objective of the present invention is to automate the process by which the specialized knowledge of a subject matter expert (SME), memorialized in computer software program, may be used by the computer software program to examine available information and apply rules developed by the SME to identify possible Precursor Activities and possible Consequent Events, as to possible time and location. These identified activities and/or events may be brought to the attention of individuals who are without specialized training so that alarms and notifications may be made and other steps taken to prevent the occurrence of an identified Consequent Event or to minimize the adverse effects thereof.

The process embodied by the present invention creates multiple precursor activity networks based upon relationships developed by SMEs, each related to a specific type of Consequent Event. As actual events unfold, these precursor activity networks are geospatially and temporally aligned and realigned in a systematic process by identifying the precursor activities in the various precursor activity networks that are consistent with actual events in accordance with the geospatial, temporal, and other precursor characteristics set by the SME. Simplistically, the SMEs create a template of precursor activities along with relationship constraints including geospatial, temporal, and/or other elements, but without specification as to precise location and/or time of occurrence. These precursor activity networks are subsequently anchored in space and time based on the occurrence of actual events.

The methodology may be analogized to that of assembling multiple puzzles piece-by-piece on a map. As actual events occur, additional pieces are added until pictures of evolving precursor activity networks and Consequent Events emerge overlaid on a geospatial region. The computer may be instructed that, when sufficient information has been gathered and embodied in a precursor activity network, the computer is to issue an alert or otherwise bring to the attention of an operator that a precursor activity network of critical significance exists. Otherwise, the computer, upon instruction, will create and provide reports that show the status of its various precursor activity networks using such parameters as the operator may determine.

Referring now to FIG. 1, there is illustrated a representative logic diagram for sample consequent event, precursor activities, and precursor activity network. As shown in FIG. 1, representative actual events that satisfy the criteria for a precursor activity are shown. FIG. 1 also shows representative geospatial and time relationships used to define whether or not satisfied precursor activities should be treated as part of the same precursor activity network. Further, FIG. 1 shows resulting instructions to be implemented by the computer as a result of a precursor activity network attaining a specified criteria. In this illustration colors may be used to indicate the relative weighting of each of the precursor activities should an actual event occur.

Referring again to FIG. 1, precursor activity 101 pertains to the recruitment of a terrorist suspect, and satisfactory events for precursor activity 101 include communication intercept and informant intelligence. Precursor activity 101 should remain active for a period of, for example, 6 months and within a geographical range of, for example, 50 miles.

Precursor activity 103 pertains to the funding of a terrorist activity, and satisfactory events for precursor activity 101 include large cash deposit and money theft. Precursor activity 103 should remain active for a period of, for example, 4 months and within a geographical range of, for example, 30 miles.

Precursor activity 105 pertains to target specific threats, and satisfactory events for precursor activity 105 include internet charter, informant intelligence, communication intercept, and voiced threats. Precursor activity 105 should remain active for a period of, for example, 1 month and within a geographical range of, for example, 0 miles.

Precursor activity 107 pertains to general threats, and satisfactory events for precursor activity 101 include internet charter, informant intelligence, communication intercept, and voiced threats. Precursor activity 107 should remain active for a period of, for example, 6 months and within a geographical range of, for example, 20 miles.

Precursor activity 109 pertains to improper access of building, and satisfactory events for precursor activity 109 include theft of uniforms or badges, and failure of alarm system. Precursor activity 109 should remain active for a period of, for example, 1 months and within a geographical range of, for example, 0 miles.

Precursor activity 111 pertains to surveillance equipment, which may be monitored upon occurrence of precursor activity 103. Satisfactory events for precursor activity 111 include surveillance equipment purchase. Precursor activity 111 should remain active for a period of, for example, 3 months and within a geographical range of, for example, 30 miles.

Precursor activity 113 pertains to bomb making equipment, which may be monitored upon occurrence of precursor activity 103. Satisfactory events for precursor activity 113 include purchase of fertilizer, purchase of explosives, and purchase of certain electronics. Precursor activity 113 should remain active for a period of, for example, 2 months and within a geographical range of, for example, 30 miles.

Precursor activity 115 pertains to surveillance, which may be monitored upon occurrence of precursor activity 101 or precursor activity 111. Satisfactory events for precursor activity 113 include photography, alarm system probes, and questions to employees. Precursor activity 115 should remain active for a period of, for example, 2 months and within a geographical range of, for example, 0 miles.

Precursor activity 117 pertains to bomb manufacturing, which may be monitored upon occurrence of precursor activity 113. Satisfactory events for precursor activity 117 include purchase of fertilizer, purchase of explosives, and purchase of certain electronics. Precursor activity 115 should remain active for a period of, for example, 2.5 months and within a geographical range of, for example, 10 miles.

Precursor activity 119 pertains to action, which may be monitored upon occurrence of precursor activities 115, 117, 105, 109, and 109. Satisfactory events for precursor activity 117 include suspicious package at potential target.

As shown in FIG. 1, precursor activities 101 through 119 form a precursor activity network. Each of the precursor activities 101 through 119 may be associated with a weighting factor, which may be designated by an SME, in this case by assigning a color. Upon occurrence of one or more of precursor activities 101 through 119, the system of the present invention may continuously calculate an indicator value using the weighting factors of the precursor activities 101 through 119. Once the indicator value exceeds a predefined threshold value, the system of the present invention may generate an alert signal indicating that consequent event 121, such as hotel bombing, is likely to occur.

Below Table 1 illustrates another exemplary precursor activities network. As shown, the precursor activities may be recruitment, funding, general threats, target-specific threats, attempts to gain unauthorized access, ID theft, theft or purchase of surveillance equipment, theft or purchase of bomb making equipment, surveillance, evidence of bomb manufacturing. Each of the precursor activities may be associated therewith spatial and time relations. For example, the spatial relation of the "evidence of bomb manufacturing" precursor activity is a maximum of 10 miles distance from a consequent event; and the temporal relation of the "evidence of bomb manufacturing" precursor activity is a maximum of 1 month time before a consequent event. Further, each of the precursor activities in this illustration is assigned a numerical weighting factor. For example, a weighting factor of 70 is assigned to the "evidence of bomb manufacturing" precursor activity.

TABLE 1

Exemplary Precursor Activities Network

| Precursor Activity | Max Distance from Consequent Event (miles) | Max Time Before Consequent Event (months) | Weighting Factor (Event Alert Preset = 100) |
|---|---|---|---|
| Recruitment | 25 | 6 | 20 |
| Funding | 50 | 12 | 20 |
| General threats | 25 | 12 | 35 |
| Target-specific threats | No Limit | 18 | 70 |
| Attempts to gain unauthorized access | 0.1 | 1 | 70 |
| ID theft | 0.1 | 0.5 | 35 |
| Theft or purchase of surveillance equipment | 50 | 6 | 20 |
| Theft or purchase of bomb making equipment | 100 | 6 | 35 |
| Surveillance | 1 | 1 | 35 |
| Evidence of bomb manufacturing | 10 | 1 | 70 |

Figure 2:
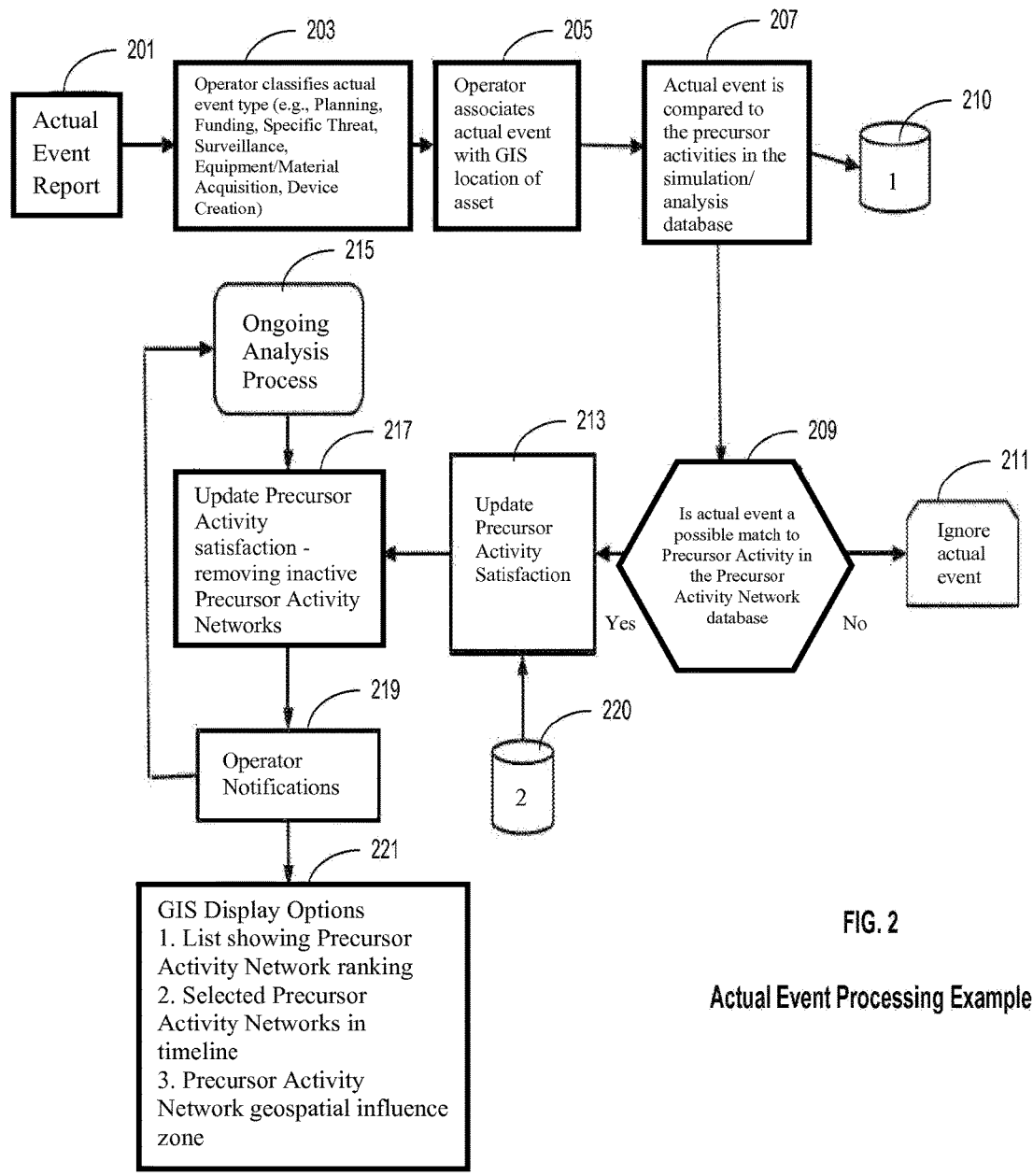
FIG. 2 is a flow diagram illustrating a method, embodied in a Precursor Activity Network, implementable by a computer software perform, in accordance with another embodiment of the present invention.

Referring to FIG. 2, there is illustrated a flow diagram for a method for providing an alert prior to the occurrence of an actual event, in accordance with another embodiment of the present invention. The method may be embodied in a Precursor Activity Network, such as that show in FIG. 1, and implementable by a computer software platform.

As shown in FIG. 2, the method begins from Step 201, in which an actual event occurs and is reported to a computer system configured to carry out the method. In Step 203, the actual event may be classified in accordance with various different event types (e.g., planning, funding, specific threat, surveillance, equipment/material acquisition, device creation, etc.). In Step 205, the actual event may be associated with key assets, such as a location information of the actual event, captured by a geographic information system (GIS). In Step 207, the actual event may be compared with a plurality of precursor activities. In one embodiment, a network of the precursor activities may be prepared and stored in a computer memory as a simulation/analysis database 210 by, for example, one or more subject matter experts, prior to the occurrence of the actual event, and data of the precursor activities may be retrieved by the computer from database 210 so as to perform the comparison in Step 207.

Further, in Step 209, the computer system determines whether the actual event constitutes a possible match for one or more of the precursor activities in the precursor activities network stored in database 210. If the actual event does not constitute a possible match, then the actual event is ignored in Step 211. In Step 213, if the actual event constitutes a possible match, then the precursor activities network in database 210 is updated by adding the actual event to database 210, and an updated simulation/analysis database 220 is stored in a computer memory.

The computer system continues to monitor actual events occurred at different times and locations as an ongoing analysis process in Step 215. In Step 217, if one of the qualifying actual event remains inactive in the precursor activities network beyond a predefined time period, for example, the computer system then removes the inactive actual event from the precursor activities network. In one embodiment, each precursor activity in the precursor activities network may be associated with a number counter which may be used to count the number of active qualifying actual events. As the monitoring process continues, the computer system calculates an indicator value based on the number of active precursor activities and the weighting factors (see Table 1 above) associated with the active precursor activities. In one embodiment, the indicator value may be calculated by summing the weighting factors of all triggered precursor activities. In Step 219, if the total indicator value exceeds the event alert preset value (in this particular case, 100), then an alerting notice is sent to a system operator indicating an increased likelihood that a consequent event would follow. In Step 221, the alerting notice is displayed to the system operator, showing a listing of ranking for the precursor activities network, selected precursor activities in timeline, and/or the geospatial influence zone of the precursor activities network.

In sum, each Precursor Activity within the Precursor Activity Network for a representative Consequent Event can be identified, along with the maximum time and distance set by the SME for the occurrence of the Precursor Activity to be related to the Consequent Event. In addition, the criteria for determining whether an alert should trigger a Precursor Activity (alert type and keyword contained in the text accompanying the alert) is provided. Any confirmatory action that is to be automatically initiated to determine if the precursor activity should be triggered is also identified. Finally, each Precursor Activity is assigned a weighting factor. The weighting factors of all triggered Precursor Activities are summed, and, if the total exceeds the event alert preset value, the system operator is provided notice of the increased likelihood of the Consequent Event along with a summary of the alerts that triggered Precursor Activities in the Precursor Activity Network.

Figure 3:
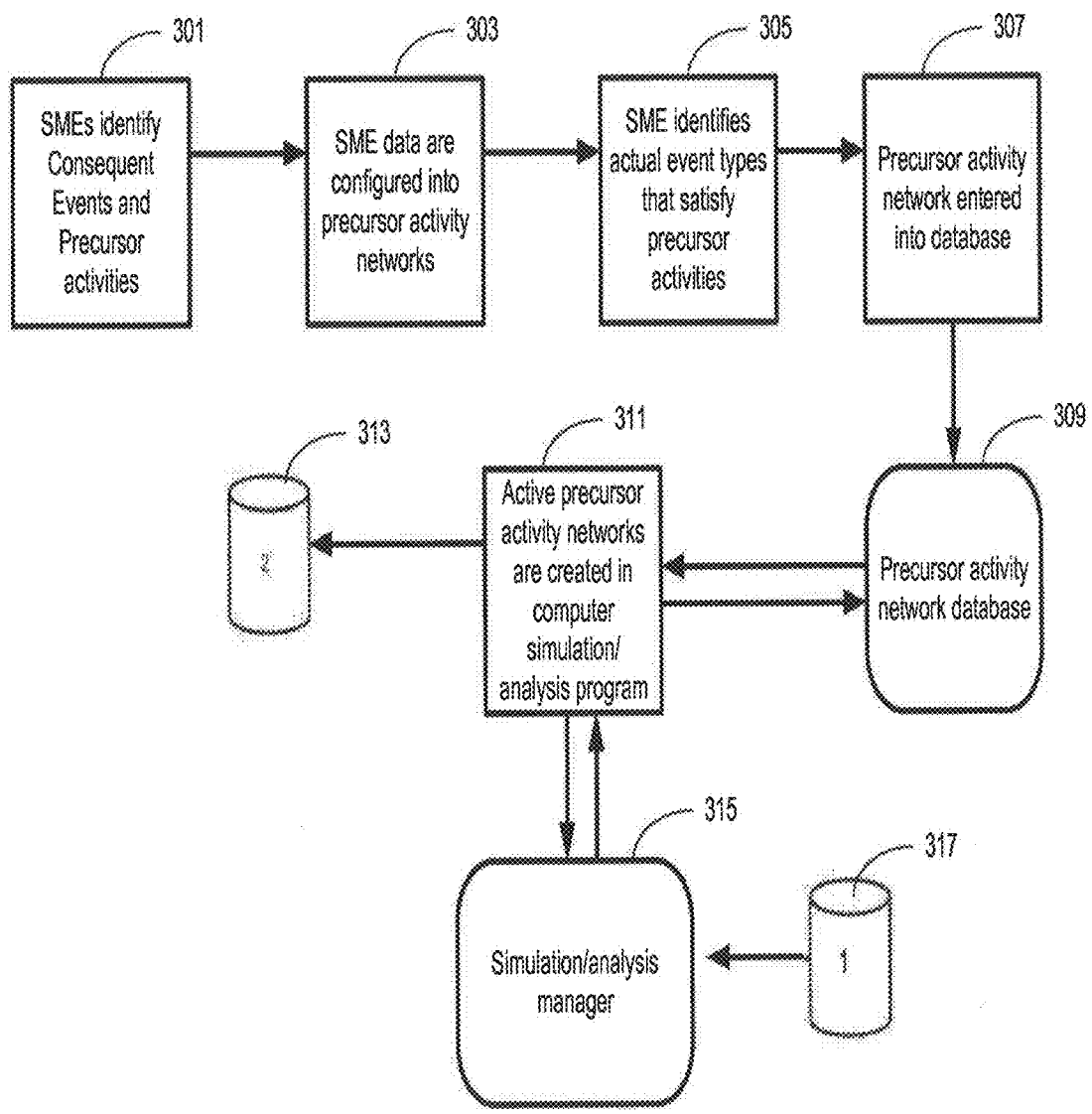
FIG. 3 is a schematic block diagram illustrating components of an event system, in accordance with an embodiment of the present invention.

Referring to FIG. 3, there is illustrated a schematic block diagram showing components of an event system, in accordance with an embodiment of the present invention. The event system includes a precursor activity network database 309, a computer simulation/analysis program, and a simulation/analysis manager 315. Precursor activity network database 309 may be constructed by performing blocks 301 through 307.

Specifically, in Block 301, an SME may identify precursor activities and consequent events. In Block 302, the precursor activities and consequent events are formatted as elements in logic networks (precursor activity networks) that embody the geospatial, time, and/or other relationships of individual precursor activities to each other. A relation is also established between the precursor activities and the consequent events that they presage, all as specified by SME-created rules. Precursor activities may include the presence of a known individual with acknowledged skills. When possible, the characteristics of critical infrastructure and key assets (CI/KR) associated with precursor activities and Consequent Events are identified (e.g., hotels, chemical suppliers, etc.).

In Block 305, the elements of actual events that cause the criteria for a precursor activity to have been satisfied are identified (e.g., types of suspicious activity reports (SARs), which are a method adopted by state and federal government agencies to document activities that may relate to illegal activities). Once an actual event that satisfies the criteria established for a precursor activity has occurred, the information relating to the actual event and the satisfaction of the precursor activity are recorded in a database in Block 307, using a suitable computer simulation/analysis program 311. In this embodiment, the Priority 5 Touch Assisted Command and Control System (TACCS™) Unity$^{SM}$ simulation/analysis manager 315 may be used.

At the time the criteria for a precursor activity have been satisfied by an actual event, that precursor activity is associated with the geospatial location of the actual event; and the precursor activity and associated actual event may be displayed using a suitable GIS viewer, such as TACCS™.

Once the criteria for a precursor activity have been satisfied, the precursor activity network containing that precursor activity remains active in the simulation/analysis program 311 until the geospatial, temporal, and/or other relationships that exist between the precursor activities in the precursor activity network can no longer be satisfied.

Behavior rules that have been developed by SMEs or others may be assigned to each precursor activity and to each precursor activity network to stipulate the action to be taken by the simulation/analysis program 311 upon the occurrence of an actual event that satisfies the criteria for any precursor activity and upon the occurrence of sufficient events such that the criteria for a critical number of precursor activities within a particular precursor activity network have been satisfied. Such behavior rules may include the following:

a. Whether or not there is an active precursor activity network containing the precursor activity, which embodies geospatial, temporal, and/or other relationships that exist between the precursor activities such that the precursor activity should be treated as part of the active precursor network; and b. Whether or not the satisfaction of the criteria for a particular precursor activity represents sufficient progress towards a Consequent Event, such that operator notification is warranted based on the number of precursor activities the criteria for which have been satisfied.

Operator notifications may be generated, which may include:

a. Notice of the existence of an active precursor activity network, including the extent of progress toward a Consequent Event; and b. Alerts indicating the progress toward a Consequent Event, including: (i) the location of actual events that have satisfied the criteria of precursor activities; and (ii) critical infrastructure and key assets associated with the precursor activities; and (iii) Consequent Events that meet the established geospatial range criteria.

Figure 4:
FIG. 4 illustrates a graphic user interface on a display panel, in accordance with an embodiment of the present invention, showing an elevated level of progress toward a Consequent Event and the location of the satisfied precursor activities.

FIG. 4 illustrates a graphic user interface on a display panel, in accordance with an embodiment of the present invention, showing an elevated level of progress toward a Consequent Event and the location of the satisfied precursor activities.

Figure 5:
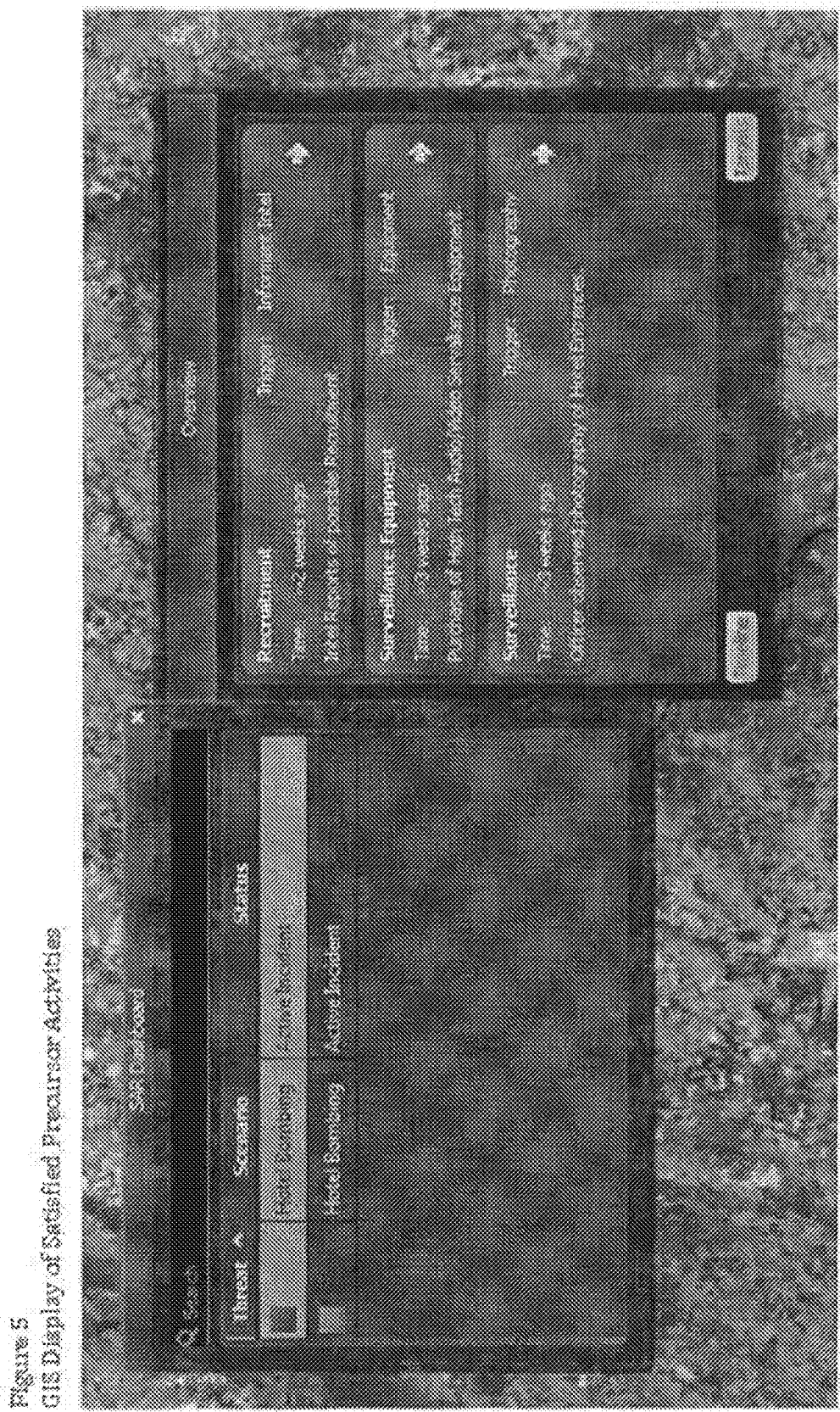
FIG. 5 illustrates a graphic user interface on a display panel, in accordance with an embodiment of the present invention, showing the status of a precursor activity network with three precursor activities having been satisfied.

FIG. 5 illustrates a graphic user interface on a display panel, in accordance with an embodiment of the present invention, showing the status of a precursor activity network with three precursor activities having been satisfied.

Figure 6:
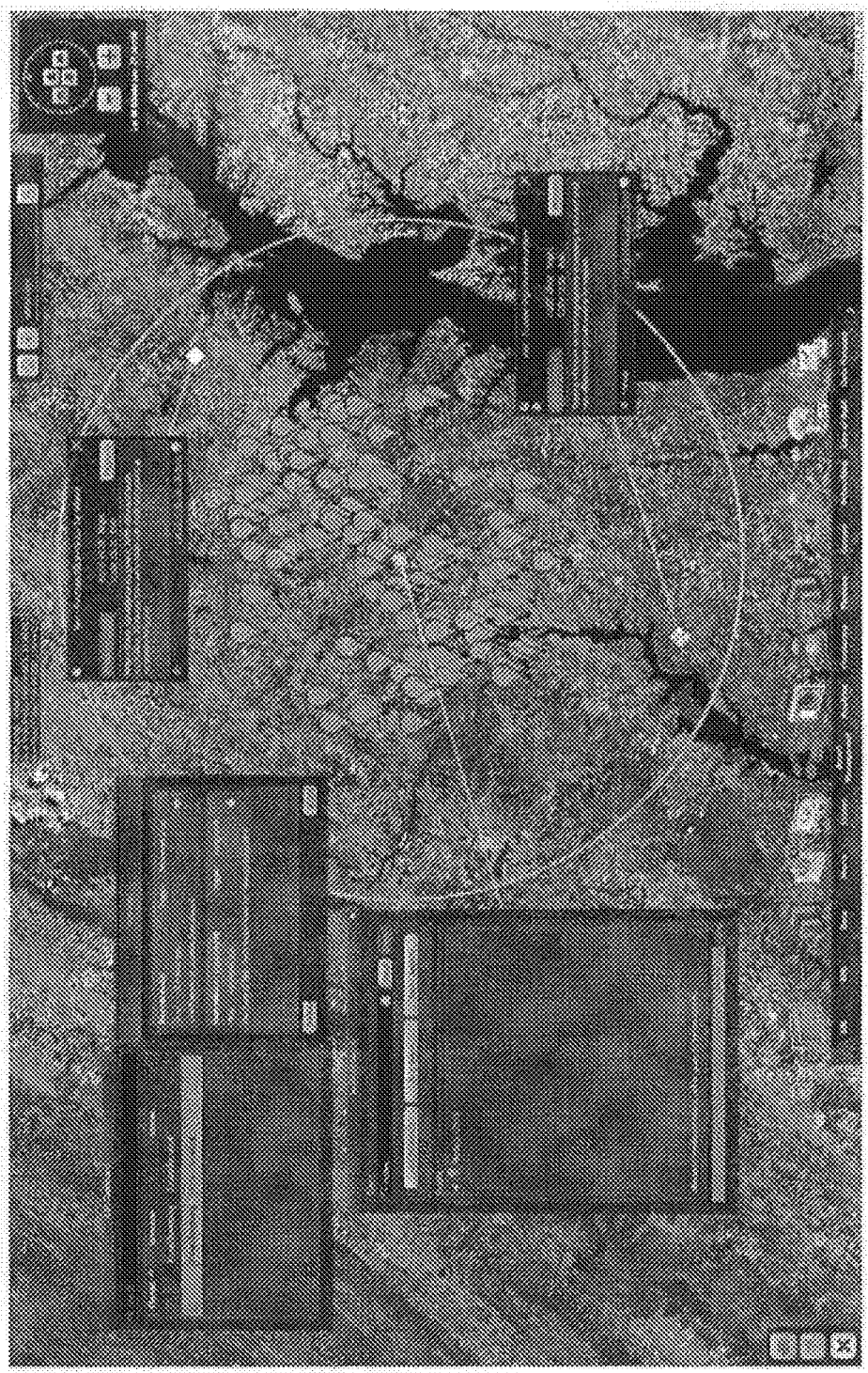
FIG. 6 illustrates a graphic user interface on a display panel, in accordance with an embodiment of the present invention, showing a search for critical infrastructure and key assets associated with the Consequent Event presaged by the satisfied precursor activities.

FIG. 6 illustrates a graphic user interface on a display panel, in accordance with an embodiment of the present invention, showing a search for critical infrastructure and key assets associated with the Consequent Event presaged by the satisfied precursor activities.

Figure 7:
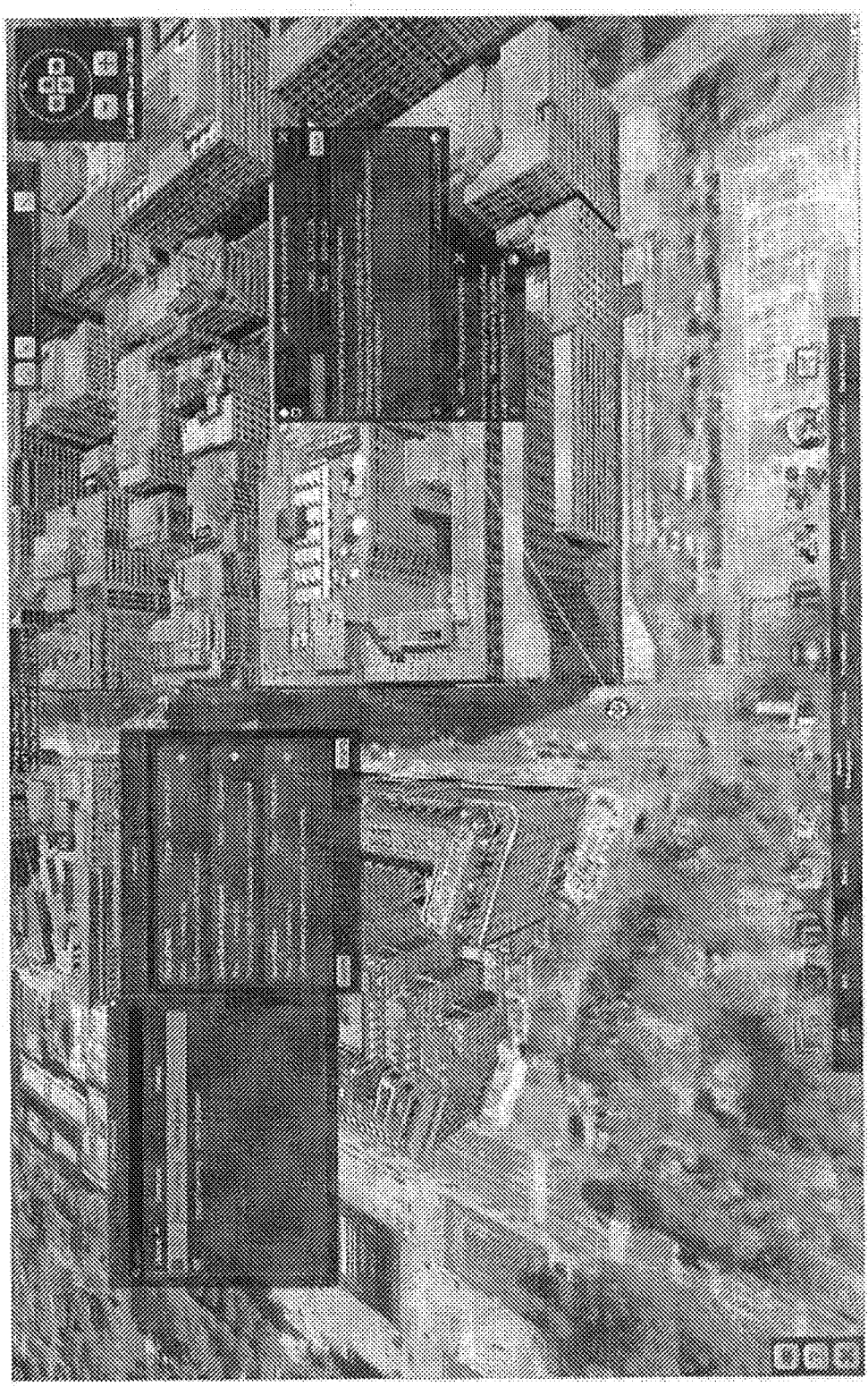
FIG. 7 illustrates a graphic user interface on a display panel, in accordance with an embodiment of the present invention, showing the location of a highly likely Consequent Event based on the satisfied precursor activities.

FIG. 7 illustrates a graphic user interface on a display panel, in accordance with an embodiment of the present invention, showing the location of a highly likely Consequent Event based on the satisfied precursor activities.

Advantages of the present invention includes, but are not limited to:

1. The task of identifying significant patterns of events within large amounts of data has been automated, not by examining data and looking for possible patterns on a case-by-case basis, but by establishing all patterns identified by the community of subject matter experts and associating actual events with these patterns as the actual events occur.

2. By using communities of subject matter experts to create rules that define patterns, and using new experience to refine the rules and thus better define the patterns, the process or method by which data are sought may thus be made more "expert." Because the process, being automated, can be made widely available, the higher levels of analyses that can be achieved through continuous refinement will also be made widely available.

3. By using one or more computers to automate the search for precursor activities, the process of identifying evolving Consequent Events and providing alerts to users can be achieved on a real or near real time basis.

Hereinafter, an exemplary implementation of the present invention is described in detail. Research shows that terrorist activities are not random activities as initially perceived. There are similar key indicators across the multiple terrorist events that if tracked and mapped, point to where the terrorist event occurred. The research identifies a core concept that terrorist tend to think globally, but act locally. Meaningful key indicators for a select region can be tracked based on a range for how far a terrorist is probably travelling and the time for how long an indicator would stay relevant.

Figure 8:
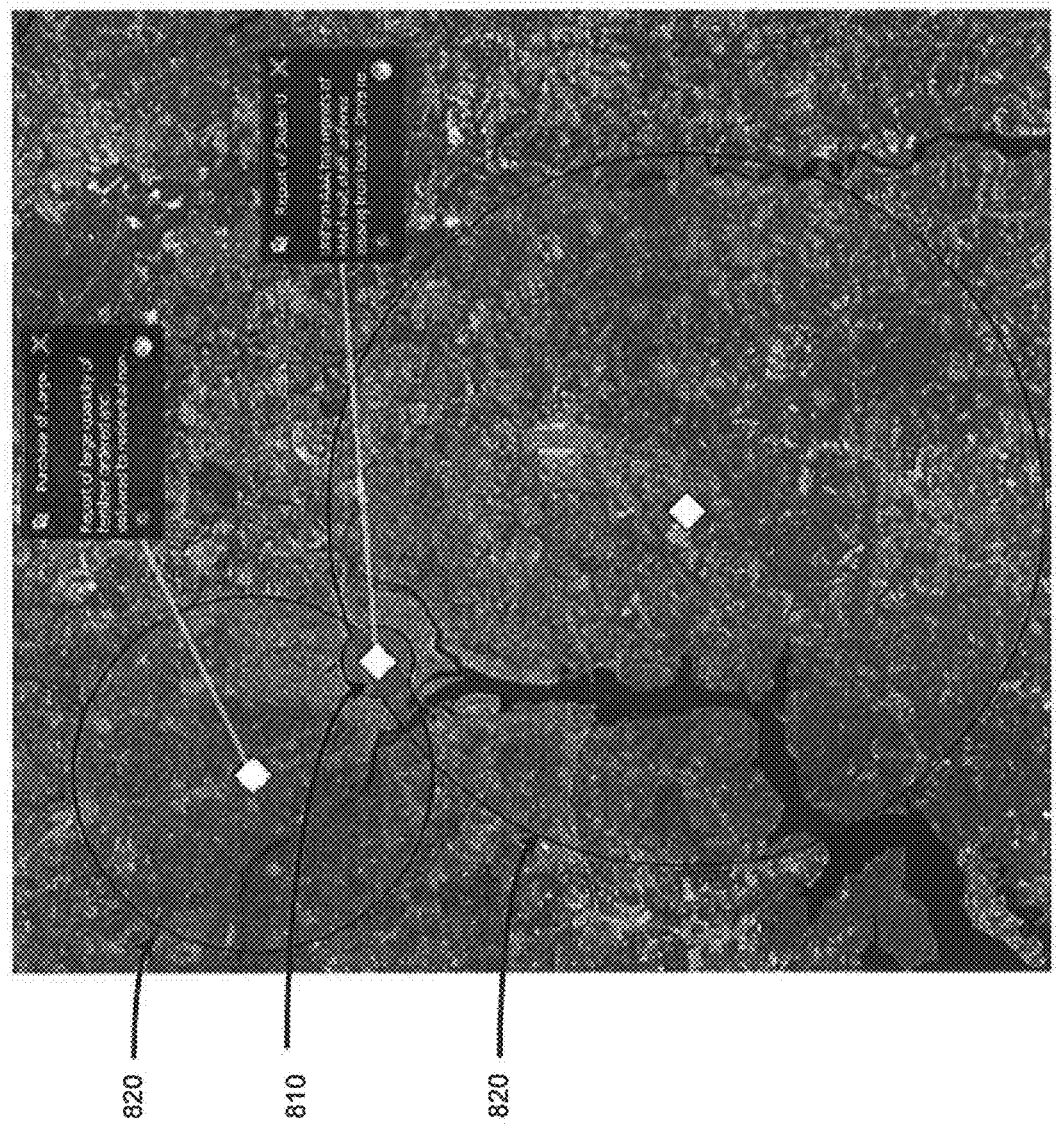
FIG. 8 illustrates a graphic user interface showing an overlap between ranges of two suspicious events in accordance with an embodiment of the present invention.

For example, an analyst tracks a potential hotel bombing and alerts come in of suspicious events, such as, explosive material stolen, uniforms stolen, and known recruitment of a fringe group occurring, which all have ranges associated therewith. FIG. 8 illustrates a graphic user interface showing an overlap 810 between ranges 820 of suspicious events in accordance with an embodiment of the present invention. If there is an overlap between the ranges of the suspicious events, the overlap area becomes a high target location.

While human behavior is unpredictable at best, this type of analysis provides a more thorough approach for processing what seemed to be initial independent intelligence spots. It also provides a method for tracking intelligence spots that may have occurred 6 months ago, but is still relevant to a particular terrorist type of event.

DEFINITION

Suspicious Activity Reports (SARs)—Quick intelligence spot detailing potential criminal activity.

Classification (indicator)—A specific type of event that an intelligence spot can be associated with so that it can be cataloged.

Category—A grouping of associated classifications.

Precursor Activity—A specific type of activity that takes into account the weight of a threat, the timeframe for the threat, the distance of the threat for each classified intelligence spot.

Threat Value—A way to weight the importance of the intelligence. The higher the threat value the stronger the intelligence, for example, 0-50 (Blue); 51-100 (Orange); 101+ (Red).

Precursor Activity Network (PAN)—A profile of a specific type of criminal activity made up of specific categories that typically lead up to that criminal activity taking place.

Automated Alert Analysis—Based on a developed Precursor Activity Network, a warning panel illustrating the likelihood of the potential criminal activity.

Preplanning

Step 1—Identify a Precursor Activity Network (PAN). PAN is a specific list of terrorist events that an Intelligence Team is interested in tracking. These events in the system can be created by the analyst. Potential networks could be, for example, Station Bombing, Train Bombing, Railway Bombing (track, bridges, and tunnels), and Deranged Individual.

Step 1.a—Identify Classifications and Categories. For each Precursor Activity Network, classifications and categories (key indicators) need to be identified. This can be done either by an agencies subject matter expert or from collected research. Once these have been identified then their threat value, time, and distance can be updated and changed by the analysis based on the differing Precursor Activity Network.

A precursor activity report of, for example, station bombing is given in below Table 2.

TABLE 2

Exemplary Precursor Activity Report

| Category | Classification | Threat Value | Time (days) | Distance (km) |
|---|---|---|---|---|
| Access | Alarm Codes Breeched | 30 | 30 | 2 |
| | Computers Hacked | | | |
| | Key/key boxes compromised | | | |
| | Theft of Uniform/Badges | 30 | 30 | 2 |
| Equipment Purchase | Large quantities of bomb making materials (fertilizer/chemicals) purchased or stolen | 30 | 100 | 10 |
| | Guns reported stolen | 30 | 100 | 10 |
| | Surveillance Equipment purchased | 20 | 190 | 10 |
| Funding | Large Cash Deposit by a group | 20 | 120 | 10 |
| | Money Theft | 20 | 120 | 10 |
| General Threat | Bombing | | | |
| | Individual Attack | | | |
| Recruitment | College Campus | | | |
| | Mercenary | | | |
| | Technical Experts | 20 | 180 | 20 |
| Surveillance | Facility Alarm System Probe reported | | | |
| | Suspicious individual identified and not cleared | | | |
| | Suspicious individual identified and not cleared | | | |
| | Suspicious photos of a facility taken and person not cleared | | | |
| | Questioning of Employees | | | |
| Target Specific Threat | Asset Specified | 70 | 30 | 0 |
| | Infrastructure Specified | 70 | 30 | 0 |

Operations

Step 1—Processing Alerts—

Figure 9:
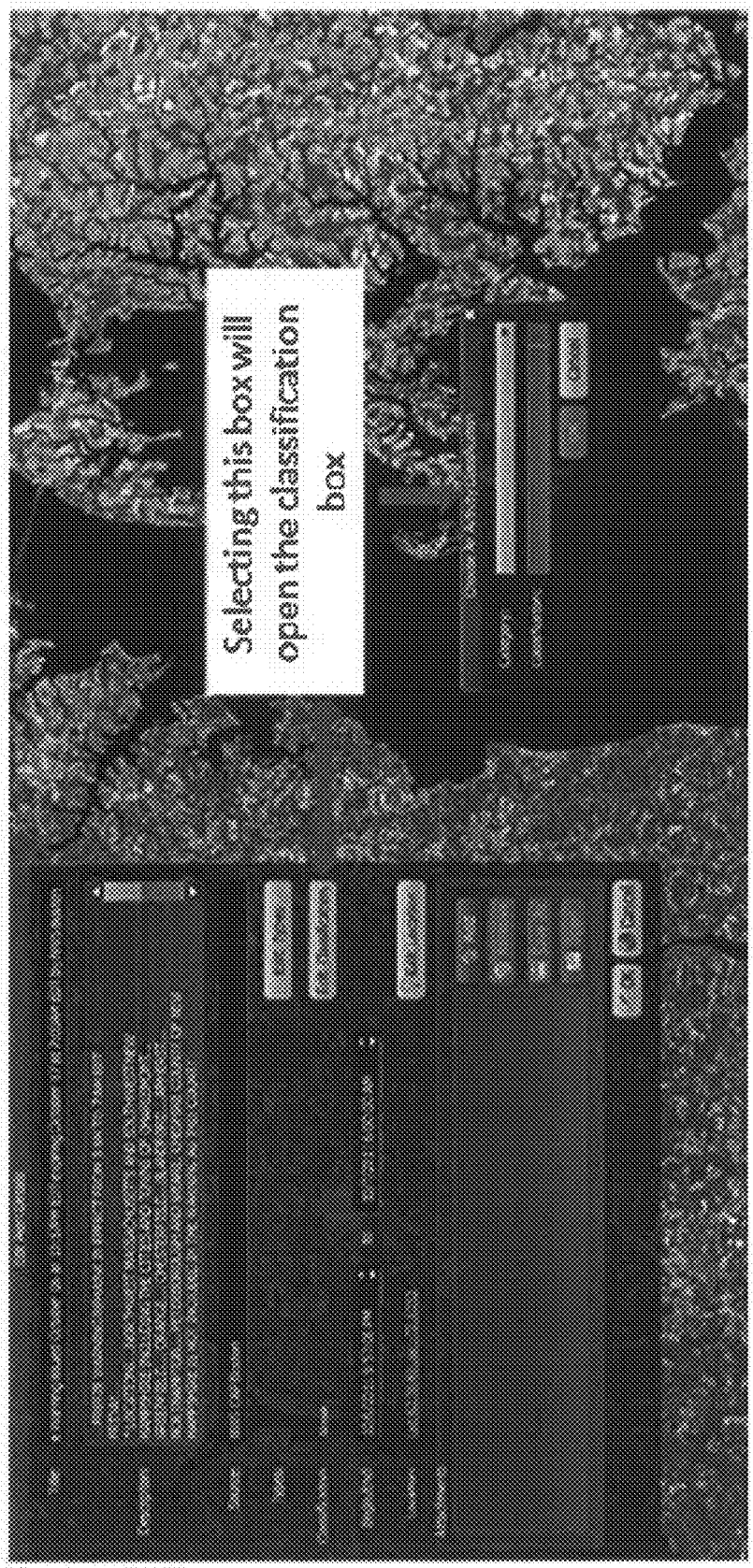
FIG. 9 illustrates a graphic user interface after the Edit Classification button is clicked, in accordance with an embodiment of the present invention.

The system of the present invention receives alerts from an intelligence team. Each of the alerts is given an Alert Type and a geographic location. The alerts may be basic emails with text. The geographic location of the alerts may be provided by the Analyst. It is noted that an alert can also be created manually by the analyst if new intelligence is received, but it is not connected to the system. The alerts may be processed according to the following procedure:

1. Select the Alerts and Notifications from the system toolbar.
2. Select the Alert inbox from the submenu.
3. The step may vary based on filters established, but assuming no filters, review the title of the alert, and if it meets a potential criteria, select the alert to review.
4. Once the Alert has been selected, click the blue gear box on the bottom left to edit the alert.
5. Once the editable Alert has open, select the Edit Classification button to open the Activity Classification to categorize the alert. FIG. 9 illustrates a graphic user interface after the Edit Classification button is clicked, in accordance with an embodiment of the present invention.
6. Click 'Ok' and it will be saved.

If at any point an alert needs its Category or Classification updated, that alert can be updated by following the same process. Also, it is recommended that the Analyst perform this task daily at a set time each day, except for new alerts that need to be manually typed in. Those exceptional alerts should be done as required.

Figure 10:
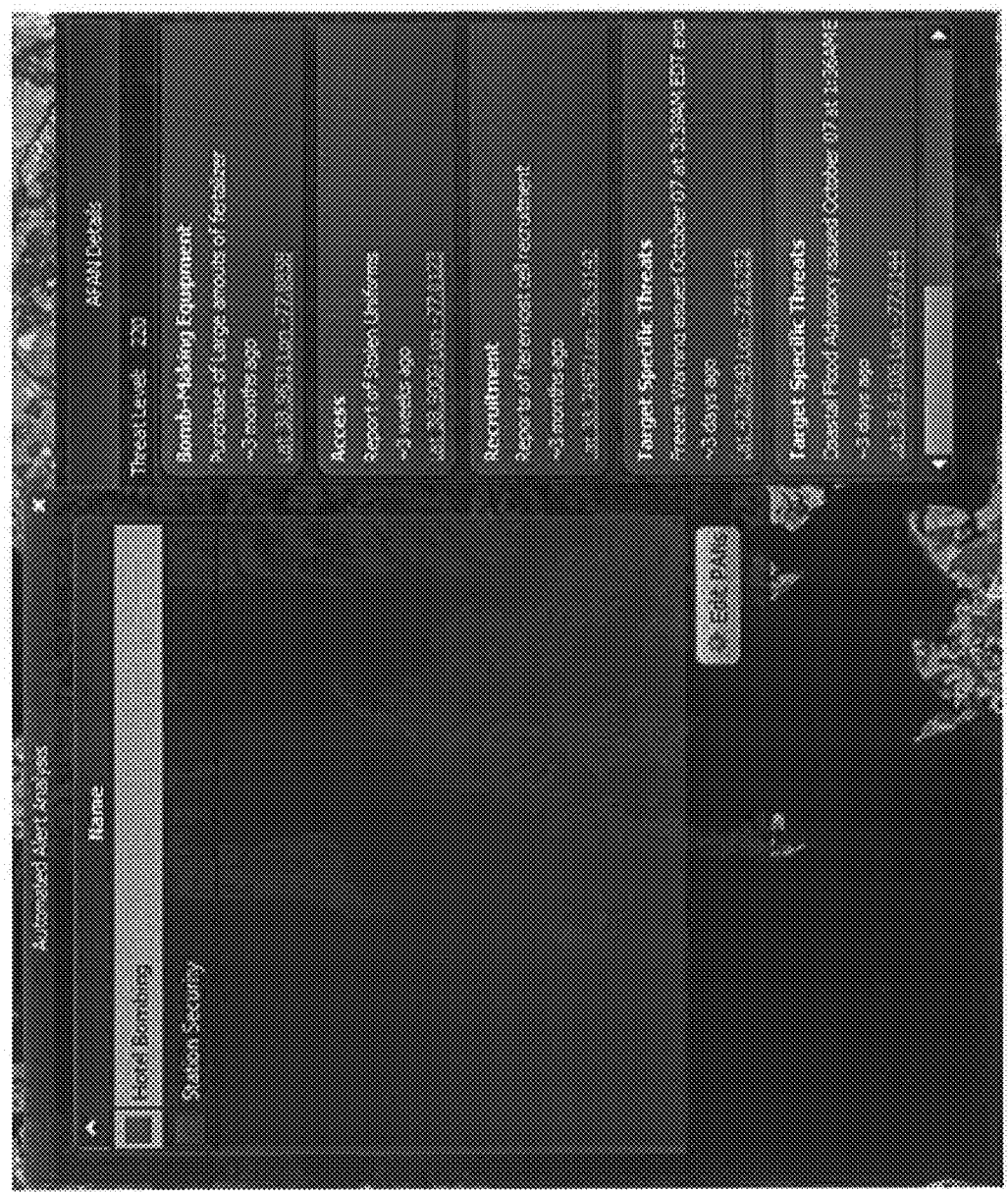
FIG. 10 illustrates a graphic user interface of the PAN triggered by the alerts, in accordance with an embodiment of the present invention.

Step 2—Monitor Automated Alert Analysis Panel. Once the alert has been categorized as a potential key indicator, the system begins processing the alert automatically based on the developed PAN perimeters. Once a minimum of two (2) alerts have created an overlap, that PAN appears with a severity color and the alerts that triggered the PAN for review. FIG. 10 illustrates a graphic user interface of the PAN triggered by the alerts, in accordance with an embodiment of the present invention. The color indicates the severity of the potential incident based on the incoming intelligence. The color cod may be: Blue—(0-50), indicators are present but the threat is minimal (Low Range); Orange—(51-100), indicators are present but the threat is stronger (Mid Range); and Red—(101+), strong evidence that an event could occur (High Range).

Once PAN has entered into the Automated Alert Analysis the following procedure is followed.

1. When a PAN has entered the Automated Alert Analysis: a) if it is Orange/Blue, the Analyst notifies the Inspector for the Intelligence Team immediately via email with the PAN and the associated Alerts; b) if it is Red, the Inspector is notified immediately via phone. If the Inspector is not available, then the Officer in Charge for the day is notified. The next steps may include: i) Notification to, for example, APD Command Staff; Corporate; TSOC/JTTF/HSOC; and SAT Coordinators to notify State and Local officials; and ii) Actions to, for example, Dispatch Special Operations (K-9); Extend Patrol to 12 hour shifts; Daily briefings of events.

2. Since the weighting of an alert can span a period of time, each daily notification to the Inspector includes whether the PAN has risen, lowered, or that the threat is no longer active.

In view of the foregoing, it can be seen that the present disclosure provides a system and a method to automate the search for precursor activities, identify evolving consequent events, and provide alerts to users in real time or near real time, thereby supporting the decision process. It is to be understood that embodiments of the present disclosure are described in detail for exemplary and illustrative purposes only. Various modifications and changes may be made by persons skilled in the art without departing from the spirit and scope of the present disclosure as defined in the appended claims.

The invention claimed is:

1. A method for providing an alert notification prior to occurrence of a consequent event, comprising:

providing, in a non-volatile computer memory, a precursor activity network comprising data associated with a plurality of precursor activities, each of the precursor activities having a weighting factor associated with, the precursor activity network being associated with a consequent event;

upon occurrence of an actual event, determining whether the actual event is consistent with at least one of the precursor activities in the precursor activity network, in accordance with criteria associated with each of the precursor activities;

if the actual event is consistent with at least one of the precursor activities in the precursor activity network, updating the precursor activity network by associating said one of the precursor activities with a geospatial location of the actual event;

calculating, after updating, an indicator value of the precursor activity;

if the indicator value exceeds a predefined threshold value, issuing an alert notification indicating an increased likelihood for the consequent event; and displaying, on a display panel, the alert notification to an operator.

2. The method of claim 1, wherein criteria associated with the plurality of precursor activities comprises a time period and a geospatial location of each of the precursor activities.

3. The method of claim 2, further comprising:

if the time period associated with the actual event no longer satisfies a predefined time period associated with the precursor activity network, updating the precursor activity network by removing the actual event from the precursor activity network.

4. The method of claim 3, wherein at least one precursor activity in the precursor activity network is associated with a number counter which may be used to count a number of active qualifying actual events.

5. The method of claim 4, wherein calculating an indicator value comprises summing weighting factors of all triggered precursor activities.

* * * * *